Figure 1:
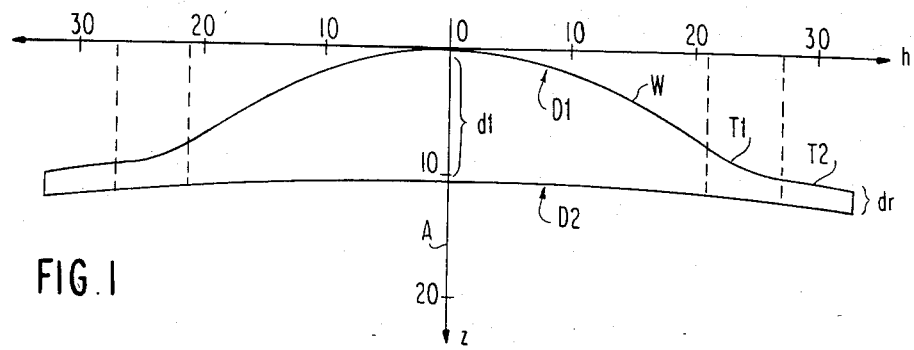

United States Patent [19]

Guilino et al.

[11] Patent Number: 4,504,128
[45] Date of Patent: Mar. 12, 1985

[54] SPECTACLE LENS WITH HIGH POSITIVE REFRACTIVE POWER

[75] Inventors: Günther Guilino, Munich; Rudolf Barth, Höhenkirchen; Werner Köppen, Gröbenzell, all of Fed. Rep. of Germany

[73] Assignee: Optische Werke G. Rodenstock, Munich, Fed. Rep. of Germany

[21] Appl. No.: 396,406

[22] Filed: Jul. 8, 1982

[30] Foreign Application Priority Data

Jul. 8, 1981 [DE] Fed. Rep. of Germany ....... 3126967
Jul. 8, 1981 [DE] Fed. Rep. of Germany ....... 3126997
Mar. 31, 1982 [DE] Fed. Rep. of Germany ....... 3211997
Mar. 31, 1982 [DE] Fed. Rep. of Germany ....... 3211998

[51] Int. Cl.³ .......................... G02B 3/02; G02C 7/02
[52] U.S. Cl. ..................................... 351/167; 350/432
[58] Field of Search ................ 351/167, 159; 350/432

[56] References Cited

U.S. PATENT DOCUMENTS 3,169,247 2/1965 Davis et al. ........................ 351/167
4,073,578 2/1978 Welsh .................................. 351/167
4,181,409 1/1980 Whitney et al. ................... 351/167

Primary Examiner—John K. Corbin
Assistant Examiner—Scott J. Sugarman
Attorney, Agent, or Firm—Craig & Burns

[57] ABSTRACT

A spectacle lens with a high positive refracting power, whose front surface has an aspheric, rotationally symmetric effective part. The effective part is configured in accordance with the following equation:

$$z = \frac{Ch^2}{1 + \sqrt{1 - (K+1)C^2h^2}} + \sum_{i=3}^{6} I_i h^i$$

where z is the sagitta, h is the distance from the optical axis, C is determined by the desired refracting power of the front surface at the vertex, and K and $I_i$ are aspheric coefficients. The aspheric coefficients K and $I_i$ are determined so that either the visual acuity V is a maximum or $|\Delta R| + |\Delta S|$ is a minimum. The lens produces a pattern of aberration which allows complete utilization of the visual field for dynamic vision.

16 Claims, 6 Drawing Figures

SPECTACLE LENS WITH HIGH POSITIVE REFRACTIVE POWER

The present invention relates to spectacle lenses with a high positive refractive power and having a convex rotationally symmetric front surface, the front surface having an aspheric effective portion, a transition zone adjacent thereto, and a boundary zone, and with a concave rear surface forming a supporting edge with the boundary zone. Such type of lens is required by individuals with severe ametropia, for example, those who have been operated on for cataracts.

Spectacle lenses with a high positive refracting power are known, for example, from DOS [German unexamined laid-open application] No. 2,941,733, U.S. Pat. No. 3,781,097, U.S. Pat. No. 3,169,247, or from "Der Schweizer Optiker", No. 3, 1981, pages 182–184. Spectacle lenses of this type, as compared with spectacle lenses with a high positive refracting power, used previously, have an effective part with a relatively large diameter of approximately 40 mm, so that the visual field is expanded to approximately ±35°. In addition, the transition zone practically completely eliminates annular scotoma and the dead angle, which are produced by the discontinuity, found in lenses used previously, in the prismatic effect at the edge of the effective portion. Moreover, the boundary zone combined with the transition zone avoids the unattractive appearance of the eye area produced in conventional lenticular lenses by the sharp bend between the effective area and the frame. This permits manufacturing lenses of the type described, even with a large total diameter of approximately 67 mm with a pleasing appearance.

However, the known lenses of the type described suffer from a number of disadvantages. Known lenses with high positive refractive power and having a convex rotationally symmetric front surface including an aspheric effect portion adjoining a transition zone and followed by a boundary zone and with a concave rear surface cover only a range of refracting powers between 8 and approximately 16 diopters, while individuals who have been operated on for cataracts in particular require powers up to 22 diopters. Despite this restricted range of refracting powers, the state of correction achieved with known lenses does not always meet the severe requirements imposed on them. For example, in one of the lenses cited hereinabove, the tangential refracting power error is less than 0.25 diopters within a visual field ±25°, while astigmatism, which is very disturbing to spectacle wearers, reaches values of 0.6 diopters and more. In addition, the aberrations, such as refracting power error and astigmatism do not change monotonically as a function of the visual angle. For example, in the aforementioned lens, astigmatism increases between a visual angle of $\sigma = 20°$ and $\sigma = 25°$ by more than 0.4 diopter, and decreases between 25° and 30° by approximately 0.2 diopter. This results in such a negative effect upon dynamic vision that many ametropes do not utilize the theoretically possible visual field for dynamic vision.

It is therefore an object of the present invention to improve a spectacle lens of the above-noted type so that the negative effects upon visual acuity over a large visual field, produced by aberrations, and the disturbances in dynamic vision, produced by angle-dependent changes in aberration, remain small while enabling high refracting powers.

In accordance with the present invention, there is provided a spectacle lens with high positive refracting power having a convex rotationally symmetric front surface, the front surface having an aspheric effective part, an adjoining transition zone, and a boundary zone, and a concave rear surface forming together with the boundary zone a supporting edge for the lens. The distance (sagitta) z of a point on the effective part of the lens from the vertex of the front surface in the direction of the optical axis is given by the equation:

$$z = \frac{Ch^2}{1 + \sqrt{1 - (K+1)C^2h^2}} + \sum_{i=3}^{6} I_i h^i$$

where h is the distance of the point from the optical axis; C is determined by the desired refracting power of the front surface and the vertex; and K, $I_3$, $I_4$, $I_5$ and $I_6$ are determined aspheric coefficients. The aspheric coefficients are determined under the condition (1) that the visual acuity is maximum in the entire area of the visual angle; or (2) that $|\Delta R| + |\Delta S|$ is minimal in the entire range of the visual angle, where $\Delta R$ is the refracting power error, i.e., the deviation of the refracting power at the point on the effective part from the refracting power at the vertex; and $\Delta S$ is the astigmatism. The relationship for the distance (sagitta) z of a point on the effective part from the vertex of the front surface measured along the optical axis, as a function of the distance h of this point from the optical axis means that the sagitta of the aspheric surface according to the present invention in an area around the vertex can be larger or smaller than the sagitta of a point located at the same distance from the optical axis and lying upon a spherical surface which has the same radius of curvature as the aspheric surface at the vertex, and contacts the latter at the vertex (so-called vertex-osculation sphere). In contradistinction, in the case of known aspheric surfaces with a high refracting power, the sagitta is always smaller than the sagitta of the osculation sphere.

According to a feature of the present invention, the aforedescribed relationship for the sagitta of the effective part, in combination with the optimization criteria for determining the numerical values of the aspheric coefficients results in spectacle lenses with a high positive refracting power, which permit an outstanding visual acuity over the entire visual field, and in which dynamic vision is not impeded by a disturbing angle dependence of the aberrations. Thus, without impeding optical performance, the effective part can be designed so that it has a large diameter and a flat shape which does not disfigure the eyeglass wearer.

In accordance with an embodiment of the present invention, the lens is constructed so that the sagitta z of the points located in a certain area about the vertex is greater than the sagitta of points which are located at the same distance h from the optical axis and lie on a spherical surface which contacts the effective part of the lens at the vertex and has the same radius of curvature as the effective part at the vertex, and the points which lie outside the area on the effective part have a smaller sagitta z than the points which are on the spherical surface and are located at the same distance h from the optical axis.

In particular, this embodiment permits the meeting of even extreme requirements, for example, regarding the refracting power of the concave side of the lens or the thickness of the spectacle lens at the center, with outstanding optical performance. The certain area in which the effective part designed according to the invention runs "inside" the osculation sphere typically has a diameter of several millimeters. Depending on the requirements imposed on the lens this area can also be very much larger or small (or even zero).

According to a further feature of the present invention, the visual V is approximated by the relationship:

$$V = 2^{-2\widetilde{\Delta R}} - \widetilde{\Delta S}$$

where
$\widetilde{\Delta R} = \min(|S|, |T|)$,
$\widetilde{\Delta S} = ||S| - |T||$,
S being the sagittal refracting power error and T being the tangential refracting power error. This approximation permits a practical optimization of the lens and produces outstanding visual acuity.

In order to provide a lens according to the present invention which result in an angular dependence of the aberrations which is especially favorable for dynamic vision, the aspheric coefficients K and $I_i$ are determined in accordance with one of the following equations:

$$\int_{\sigma=0°}^{30°} |\Delta S| d\sigma = 2 \cdot \int_{\sigma=0°}^{30°} |\Delta R| d\sigma \quad (1)$$

where the integration takes place over visual angle $\sigma$, and
$\Delta S = T - S$ is the astigmatism, and
$\Delta R = (S+T)/2$ is the refracting power error.

$$3V(10°) + V(25°) = \text{maximum}, \quad (2)$$

where V(10°) is the visual acuity at a visual angle $\sigma = 10°$ and V(25°) is the visual acuity at a visual angle $\sigma = 25°$.

$$\int_{\sigma=0°}^{30°} |\Delta S| d\sigma = \int_{\sigma=0°}^{30°} |\Delta R| d\sigma \quad (3)$$

where the integration takes place over the visual angle $\sigma$ and,
$\Delta S = T - S$ is the astigmatism, and
$\Delta R = (S+T)/2$ is the refracting power error.

$$|\Delta R(25°)| + |\Delta S(25°)| = \text{minimum} \quad (4)$$

where
$\Delta S = T - S$ is the astigmatism at a visual angle $\sigma = 25°$ and
$\Delta R = (S+T)/2$ is the refractive power error at a visual angle $\sigma = 25°$.

It has been found that manufacturing tolerances and individual variations have comparatively little effect in lenses when equations (1) and (3) are utilized. Further, lenses configured according to equations (2) and (4) are not only simple to calculate, but also show an advantageous distribution of aberrations over the entire visual angle range.

According to another feature of the present invention, the transition zone is configured in accordance with the equation:

$$z = \sum_{i=0}^{4} a_i h^i$$

where $a_i$ is a coefficient so determined that the transition zone is always adjacent to the effective part with respect to the functional value and first derivative thereof. This relationship produces a lens which is so shaped that not only are annular scotoma and the dead angle caused practically to disappear completely, but they can also be cast easily from a plastic.

In accordance with a further feature of the present invention, the boundary zone and the transition zone are so connected that at the separating line the functional value and first derivative of the function of the boundary zone and of the transition zone substantially coincide, and wherein the boundary zone is so constructed that the supporting edge has a substantially constant thickness. The boundary zone may be configured in accordance with the equation:

$$z = \sum_{i=0}^{4} b_i h^i$$

where $b_i$ is a coefficient so determined that the boundary zone is always in contact with the transition zone with respect to the functional value and the first derivative thereof, the boundary zone being configured so that the supporting edge has a substantially constant thickness. Such configuration contributes to economical manufacture of the lens of the present invention by means of a casting method as well as low weight for lenses with large diameters.

These and further objects, features and advantages of the present invention will become more obvious from the following description when taken in connection with the accompanying drawings, wherein FIG. 1 is a cross sectional view through a lens in accordance with the present invention.

Figure 2A:
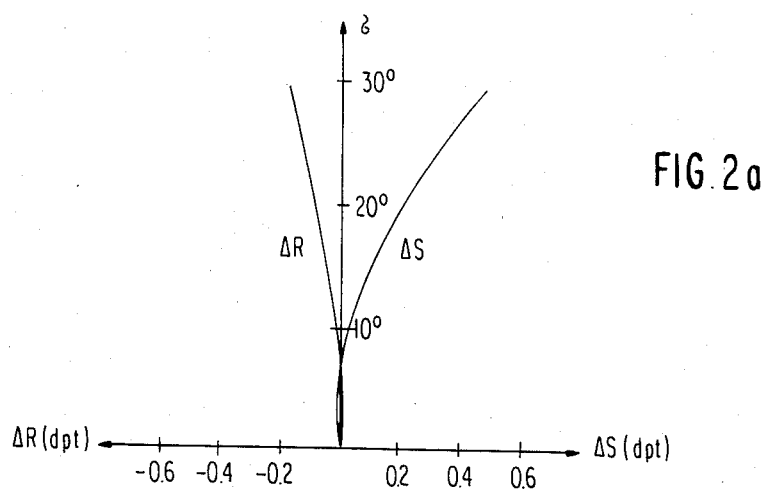
Figure 2B:
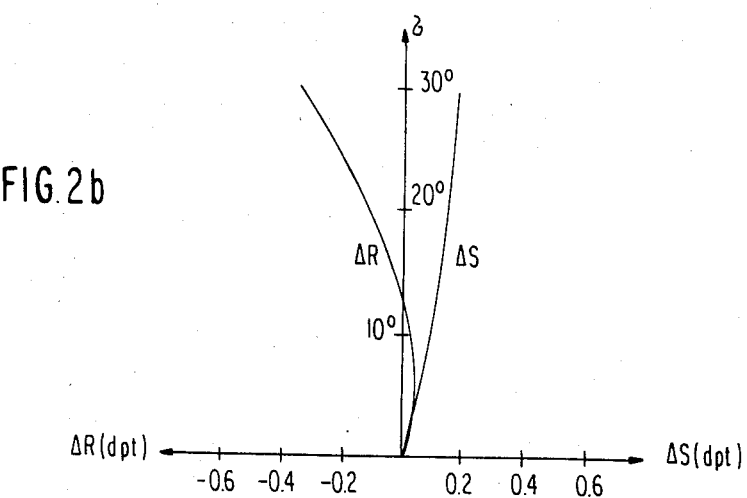
Figure 3A:
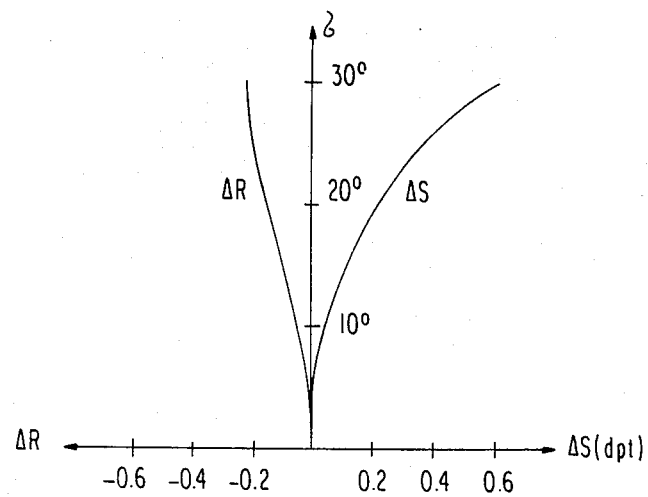
Figure 3B:
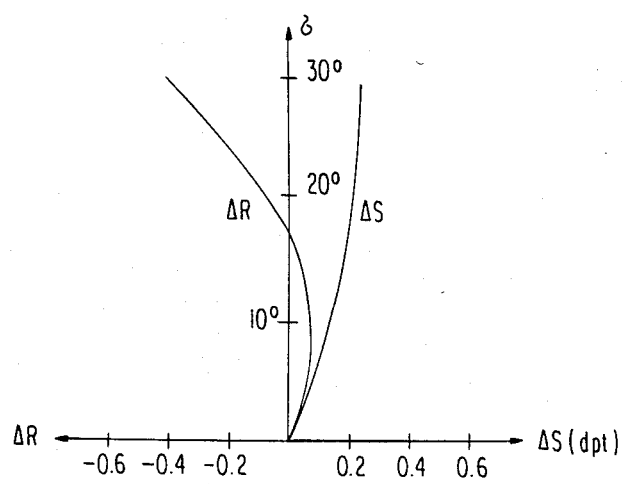

FIGS. 2a and 2b show curves illustrating the dependence of aberrations upon the visual angle, and FIGS. 3a and 3b show curves for lenses of the present invention for comparison with 3c showing curves for a known lens.

FIG. 1 is a cross sectional view through a lens according to the present invention. As shown, the lens has a convex rotationally symmetric front surface D1 with an aspheric effective part or portion W, a transition zone T1 adjacent thereto, and a following boundary zone T2. The inner or rear surface D2 of the lens is concave and can be made spherical, aspherical, or toroidal. The surface or rear D2 forms a supporting edge or a supporting edge area with an approximately constant thickness dr with the boundary zone T2. This permits the lens, according to the present invention, to be easily installed even in frames with large diameters. The shape of effective part W is described by the following equation:

$$z = \frac{Ch^2}{1 + \sqrt{1 - (K+1)C^2h^2}} + \sum_{i=3}^{6} I_i h^i$$

while the shape of transition zone T1 is described by:

$$z = \sum_{i=1}^{4} a_i h^i$$

and the shape of boundary zone T2 is described by:

$$z = \sum_{i=1}^{4} b_i h^i$$

In the above: z is the distance (sagitta) of a point on the effective part/transition zone/boundary zone from the vertex O of the front surface D1 measured in the direction of the optical axis A, h is the distance of this point from optical axis A, K and $I_i$ are aspheric coefficients, and C is determined by the desired refractory power of the front surface at the vertex as described below. Coefficients $a_i$ and $b_i$ are so determined that the transition zone T1 is always adjacent to the effective part W with respect to its functional value and first derivative and the boundary zone T2 is always adjacent to the transition zone T1 with respect to its functional value and first derivative, respectively. The numerical values for such coefficients may vary over a wide range according to the specific shape of the surface W and D2.

Tables 1 and 2 provide values in accordance with different embodiments of lenses of the present invention.

TABLE 1

| C | K | $I_3$ | $I_4$ | $I_5$ | $I_6$ |
|---|---|---|---|---|---|
| 1/47.511 | −0.195 | $-1.4 \times 10^{-6}$ | 0 | 0 | 0 |
| 1/44.757 | −0.25 | 0 | 0 | 0 | 0 |
| 1/44.76 | −0.073 | $-1.0 \times 10^{-6}$ | 0 | 0 | 0 |
| 1/41.016 | −0.284 | $0.9 \times 10^{-6}$ | 0 | 0 | 0 |
| 1/38.405 | −0.314 | $1.0 \times 10^{-6}$ | 0 | 0 | 0 |
| 1/36.232 | −0.332 | $-0.7 \times 10^{-6}$ | 0 | 0 | 0 |
| 1/34.269 | −0.398 | $7.0 \times 10^{-6}$ | 0 | 0 | 0 |
| 1/32.710 | −0.379 | $5.2 \times 10^{-6}$ | 0 | 0 | 0 |
| 1/31.53 | −0.394 | $10.0 \times 10^{-6}$ | 0 | 0 | 0 |

In the embodiments shown in Table 1, the aspheric coefficients K and $I_i$ (i=3 ... 6) were determined using the optimization requirement:

$$3V(10°) + V(25°) = \text{maximum}$$

where
V(10°) is the visual acuity at a visual angle $\sigma=10°$ and V(25°) is the visual acuity at a visual angle $\sigma=25°$.

TABLE 2

| C (multiplication factor) | K | $I_3$ (× $10^{-6}$) | $I_4$ (× $10^{-7}$) | $I_5$ (× $10^{-10}$) | $I_6$ (× $10^{-12}$) |
|---|---|---|---|---|---|
| 1/44.76 | −0.722 | 6.5 | 1.0 | 1.0 | 1.0 |
| 1/44.757 | −0.272 | 5.0 | 1.0 | 1.0 | 1.0 |
| 1/38.41 | −0.485 | 8.2 | 1.4 | 7.0 | 1.0 |
| 1/34.27 | −0.495 | 9.6 | 2.6 | 1.0 | 1.0 |
| 1/31.53 | −0.474 | 11.1 | 3.02 | 2.0 | 1.0 |
| 1/29.64 | −0.531 | 12.0 | 3.23 | 1.0 | 1.0 |
| 1/27.97 | −0.54 | 12.7 | 3.40 | 8.0 | 1.0 |
| 1/27.1 | −0.528 | 13.5 | 3.4 | 1.0 | 1.0 |
| 1/27.104 | −0.62 | 13.5 | 3.6 | 1.0 | 1.0 |

In the embodiments shown in Table 2, the aspheric coefficients K and $I_i$ (i=3 ... 6) were determined by the optimization requirement:

$$|\Delta R(25°)| + |\Delta S(25°)| = \text{minimal}$$

where $\Delta S = T - S$ is the astigmatism at a visual angle $\sigma=25°$ and $\Delta R = (S+T)/2$ is the refracting power error at a visual angle of $\sigma=25°$. S and T are the sagittal and tangential refracting power errors, i.e., the deviation of the sagittal or tangential refracting power at a certain point on the effective part from the sagittal and/or tangential refracting power at the vertex.

In the embodiments according to both tables, the determination of the aspheric coefficients K and $I_i$ have been carried out for a certain concave area D2. If several surfaces with the same vertical refracting power are listed (i.e. with equal values of C), the optimization was carried out in each case for different values of the concave (inner or rear) surface. The aspheric front surfaces according to the present invention, however, could be used without any significant deterioration of the optical performance with concave surfaces D2 that have refracting powers between −0.0 and −4.0.

The value of C is determined in each case by the desired vertical refracting power Ds of the front surface. $C = 1/r_o$ and $r_o$ is the radius of curvature of the effective part W at the vertex. There is also a relationship: $Ds = (n-1) \times 1000/r_o$. If the radius of curvature is expressed as: $r_o = 1/C$ in mm, the refracting power at the vertex Ds is obtained in diopters (n is the refractive index).

In the embodiments given, the diameter of the effective part W is 42 mm, while the thickness of the lens at the center (measured along the optical axis) is between approximately 7 mm for vertex refracting powers Ds of 11.25 diopters and approximately 12.5 mm for vertex refracting powers Ds of 19.37 diopters, and the refractive index is n=1.525.

In addition, in calculating the aspheric coefficients K and $I_i$ listed in Table 1, the visual acuity V is approximated by the equation:

$$V = 2^{-2\widetilde{\Delta R} - \widetilde{\Delta S}}$$

where, $\widetilde{\Delta R} = \min(|S|, |T|)$, and $\widetilde{\Delta S} = ||S| - |T||$
FIGS. 2(a) and 2(b) show the dependence of the astigmatism ΔS and refracting power error ΔR on the visual angle σ, with FIG. 2a representing a lens from Table 1 and FIG. 2b a lens from Table 2. The refracting power of the front surface is 11.73 diopters in both cases (C=1/44.76). As can be seen from these figures, not only is the absolute value of the aberration small in the lenses according to the present invention, but the curve is substantially monotonic as a function of the aberration. The non-monotonic curve produced in the lens according to the present invention as shown in FIG. 2b, in the range of small visual angles σ up to approximately 10°, creates no problems because of the extraordinarily small absolute value. Since the change in aberration per unit angle is also very small, the lenses according to the invention permit the wide visual field to be employed for dynamic vision.

Figure 3C:
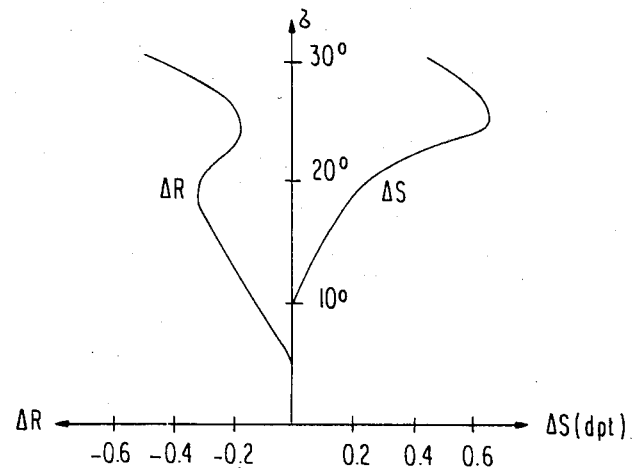

FIG. 3 shows a comparison between lenses according to the present invention and a known lens according to DOS No. 2,941,733, to clarify the technical progress which has been achieved. Once again, the curve of an aberration which is particularly important for good visual acuity has been plotted, namely the refracting power error ΔR and astigmatism ΔS, as a function of visual angle σ. In all lenses, the refracting power of the front surface is approximately 16 diopters. As can be seen, in the lenses according to the present invention (FIG. 3a shows a lens according to Table 1, whereas FIG. 3b shows a lens according to Table 2) the aberrations reach much lower absolute values; the curves are more uniform and the change in aberration per unit visual angle is less than with the known lens (FIG. 3c).

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A spectacle lens with high positive refracting power comprising a convex rotationally symmetric front surface, said front surface having an aspheric effective part, an adjacent transition zone, and a boundary zone, said lens having a concave rear surface forming together with the boundary zone a supporting edge, said lens being constructed so that a sagitta z of a point on the effective part from the vertex of the front surface in the direction of the optical axis is given by the equation:

$$z = \frac{Ch^2}{1 + \sqrt{1 - (K+1)C^2h^2}} + \sum_{i=3}^{6} I_i h^i$$

where h is the distance of this point from optical axis; C is determined by the desired refracting power of the front surface at the vertex; and K, $I_3$, $I_4$, $I_5$, and $I_6$ are aspheric coefficients so determined that $|\Delta R| + |\Delta S|$ is a minimum over the entire range of the visual angle, where $\Delta R$ is the refracting power error, and $\Delta S$ is the astigmatism, and where $\Delta S = T - S$ and $\Delta R = (S+T)/2$, T being the tangential refracting power error and S being the sagittal refracting power error.

2. A spectacle lens with high positive refracting power comprising a convex rotationally symmetric front surface, said front surface having an aspheric effective part, an adjacent transition zone, and a boundary zone, said lens having a concave rear surface forming together with the boundary zone a supporting edge, said lens being constructed so that a sagitta z of a point on the effective part from the vertex of the front surface measured in the direction of the optical axis is given by the equation:

$$z = \frac{Ch^2}{1 + \sqrt{1 - (K+1)C^2h^2}} + \sum_{i=3}^{6} I_i h^i$$

where h is the distance of this point from optical axis; C is determined by the desired refracting power of the front surface at the vertex; and K, $I_3$, $I_4$, $I_5$, and $I_6$ are aspheric coefficients so determined that the visual acuity is a maximum over the entire area of the visual angle.

3. A spectacle lens according to claim 1 or 2, wherein the sagitta z with increasing distance h from the optical axis is initially larger than the sagitta of points which are located at the same distance h from the optical axis and lie on a spherical surface which contacts the effective part at the vertex and has the same radius of curvature as the effective part at the vertex, and then is smaller than the sagitta of the points which are on the spherical surface and are located at the same distance h from the optical axis.

4. A spectacle lens according to claim 3, wherein the visual accuity V is approximated by the relationship:

$$V = 2^{-2\widetilde{\Delta R}} - \widetilde{\Delta S}$$

where
$\widetilde{\Delta R} = \min(|S|, |T|)$,
$\widetilde{\Delta S} = ||S| - |T||$,
S being the sagittal refracting power error and T being the tangential refracting power error.

5. A spectacle lens according to claim 3, wherein the coefficients K and $I_i$ (i=3 ... 6) are determined in accordance with the following equation:

$$\int_{\sigma=0°}^{30°} |\Delta S| d\sigma = 2 \cdot \int_{\sigma=0°}^{30°} |\Delta R| d\sigma$$

where the integration takes place over visual angle $\sigma$, and
$\Delta S = T - S$ is the astigmatism, and
$\Delta R = (S+T)/2$ is the refracting power error.

6. A spectacle lens according to claim 3, wherein the coefficients K and $I_i$ (i+3 ... 6) are determined in accordance with the following equation:

$$3V(10°) + V(25°) = \text{maximum},$$

where $V(10°)$ is the visual acuity at a visual angle $\sigma = 10°$ and $V(25°)$ is the visual acuity at a visual angle $\sigma = 25°$.

7. A spectacle lens according to claim 3, wherein the coefficients K and $I_i$ (i=3 ... 6) are determined in accordance with the following equation:

$$\int_{\sigma=0°}^{30°} |\Delta S| d\sigma = \int_{\sigma=0°}^{30°} |\Delta R| d\sigma$$

where the integration takes place over the visual angle $\sigma$ and,
$\Delta S = T - S$ is the astigmatism, and
$\Delta R = (S+T)/2$ is the refracting power error.

8. A spectacle lens according to claim 3, wherein the coefficients K and $I_i$ (i=3 ... 6) are determined in accordance with the following equation:

$$|\Delta R(25°)| + |\Delta S(25°)| = \text{minimum}$$

where $\Delta S = T - S$ is the astigmatism at a visual angle $\sigma = 25°$ and $\Delta R = (S+T)/2$ is the refractive power error at a visual angle $\sigma = 25°$.

9. A spectacle lens according to claim 3, wherein the coefficients $I_5$ and $I_6$ are zero.

10. A spectacle lens according to claim 9, wherein the coefficient $I_4$ is zero.

11. A spectacle lens according to claim 3, wherein the rear surface of said lens is aspherical.

12. A spectacle lens according to claim 3, wherein the configuration of the transition zone is given by the following equation:

$$z = \sum_{i=0}^{4} a_i h^i$$

where $a_i$ is a coefficient so determined that the transition zone is always adjacent to the effective part with respect to the functional value and first derivative thereof.

13. A spectacle lens according to claim 3, wherein the boundary zone and the transition zone are so connected that at the separating line the functional value and first derivative of the function of the boundary zone and of the transition zone substantially coincide, and wherein the boundary zone is so constructed that the supporting edge has a substantially constant thickness.

14. A spectacle lens according to claim 3, wherein the configuration of the boundary zone is given by the equation:

$$z = \sum_{i=0}^{4} b_i h^i$$

where $b_i$ is a coefficient so determined that the boundary zone is always in contact with the transition zone with respect to the functional value and the first derivative thereof, the boundary zone being configured so that the supporting edge has a substantially constant thickness.

15. A spectacle lens according to claim 3, wherein numerical values for the effective part of the front surface of said lens are selected from the following table:

TABLE 1

| C | K | $I_3$ | $I_4$ | $I_5$ | $I_6$ |
|---|---|---|---|---|---|
| 1/47.511 | −0.195 | $-1.4 \times 10^{-6}$ | 0 | 0 | 0 |
| 1/44.757 | −0.25 | 0 | 0 | 0 | 0 |
| 1/44.76 | −0.073 | $-1.0 \times 10^{-6}$ | 0 | 0 | 0 |
| 1/41.016 | −0.284 | $0.9 \times 10^{-6}$ | 0 | 0 | 0 |
| 1/38.405 | −0.314 | $1.0 \times 10^{-6}$ | 0 | 0 | 0 |
| 1/36.232 | −0.332 | $-0.7 \times 10^{-6}$ | 0 | 0 | 0 |
| 1/34.269 | −0.398 | $7.0 \times 10^{-6}$ | 0 | 0 | 0 |
| 1/32.710 | −0.379 | $5.2 \times 10^{-6}$ | 0 | 0 | 0 |
| 1/31.53 | −0.394 | $10.0 \times 10^{-6}$ | 0 | 0 | 0 |

16. A spectacle lens according to claim 3, wherein numerical values for the effective part of the front surface of said lens are selected from the following table:

TABLE 2

| C (multiplication factor) | K | $I_3$ ($\times 10^{-6}$) | $I_4$ ($\times 10^{-7}$) | $I_5$ ($\times 10^{-10}$) | $I_6$ ($\times 10^{-12}$) |
|---|---|---|---|---|---|
| 1/44.76 | −0.722 | 6.5 | 1.0 | 1.0 | 1.0 |
| 1/44.757 | −0.272 | 5.0 | 1.0 | 1.0 | 1.0 |
| 1/38.41 | −0.485 | 8.2 | 1.4 | 7.0 | 1.0 |
| 1/34.27 | −0.495 | 9.6 | 2.6 | 1.0 | 1.0 |
| 1/31.53 | −0.474 | 11.1 | 3.02 | 2.0 | 1.0 |
| 1/29.64 | −0.531 | 12.0 | 3.23 | 1.0 | 1.0 |
| 1/27.97 | −0.54 | 12.7 | 3.40 | 8.0 | 1.0 |
| 1/27.1 | −0.528 | 13.5 | 3.4 | 1.0 | 1.0 |
| 1/27.104 | −0.62 | 13.5 | 3.6 | 1.0 | 1.0 |

* * * * *